US 6,720,044 B2

(12) United States Patent
Andersson et al.

(10) Patent No.: US 6,720,044 B2
(45) Date of Patent: *Apr. 13, 2004

(54) POLYOLEFINIC CLOSURES COMPRISING PENETRABLE PLUGS AND ANNULAR CHANNELS

(75) Inventors: Gunnar Andersson, Sollentuna (SE); Des Mulligan, Co Donegal (IE)

(73) Assignee: Pharmacia AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,210

(22) Filed: Feb. 20, 1998

(65) Prior Publication Data

US 2002/0197426 A1 Dec. 26, 2002

Related U.S. Application Data

(60) Provisional application No. 60/038,523, filed on Feb. 26, 1997.

(30) Foreign Application Priority Data

Feb. 20, 1997 (SE) ................................................. 9700597

(51) Int. Cl.[7] ............................ B29C 45/14; B29C 61/06
(52) U.S. Cl. ...................... 428/35.7; 215/232; 215/247; 215/364; 425/812; 428/903.3
(58) Field of Search ............................ 428/35.7, 903.3; 215/232, 247, 364; 425/812

(56) References Cited

U.S. PATENT DOCUMENTS

| 1,645,248 A | * 10/1927 | Lower ........................ 425/812 |
| 2,277,599 A | * 3/1942 | McGinnis .................... 425/812 |
| 4,303,067 A | 12/1981 | Connolly et al. ........... 128/272 |
| 4,512,486 A | * 4/1985 | Kobayashi et al. ......... 215/249 |
| 4,524,880 A | 6/1985 | Danielson et al. .......... 220/288 |
| 4,975,308 A | 12/1990 | Bayan et al. ............... 428/34.1 |
| 5,247,015 A | 9/1993 | Bayan ......................... 525/99 |
| 5,839,592 A | * 11/1998 | Hayes ......................... 215/230 |
| 6,308,847 B1 | * 10/2001 | Andersson et al. ......... 215/247 |

FOREIGN PATENT DOCUMENTS

| EP | 0 097 054 B1 | 6/1983 | ............. A61J/1/00 |
| EP | 0 097 054 A2 | 6/1983 | ............. A61J/1/00 |
| WO | 83/03572 | 10/1983 | ............ B32B/31/00 |
| WO | 95/08317 | 3/1995 | ............. A61J/1/00 |
| WO | WO 95/08317 | * 3/1995 | ............. A61J/1/00 |
| WO | 97/37628 | 10/1997 | ............. A61J/1/00 |
| WO | 97/39952 | 10/1997 | ........... B65B/55/02 |

* cited by examiner

*Primary Examiner*—Sandra M. Nolan
(74) *Attorney, Agent, or Firm*—Gilberto M. Villacorta; Serge Sira; Katten Muchin Zavis Rosenman

(57) ABSTRACT

The invention relates to pharmaceutical closures for containers made of flexible polyolefinic materials which are suitable to be filled with parentally administrable fluids prior to their sealing and sterilization. The polyolefinic closures have an excellent resealing capacity after being penetrated by a piercing device for establishing fluid communication with the container, even after multiple entries into the container.

7 Claims, 1 Drawing Sheet

POLYOLEFINIC CLOSURES COMPRISING PENETRABLE PLUGS AND ANNULAR CHANNELS

CROSS REFERENCE TO RELATED APPLICATION(S)

Figure 1:
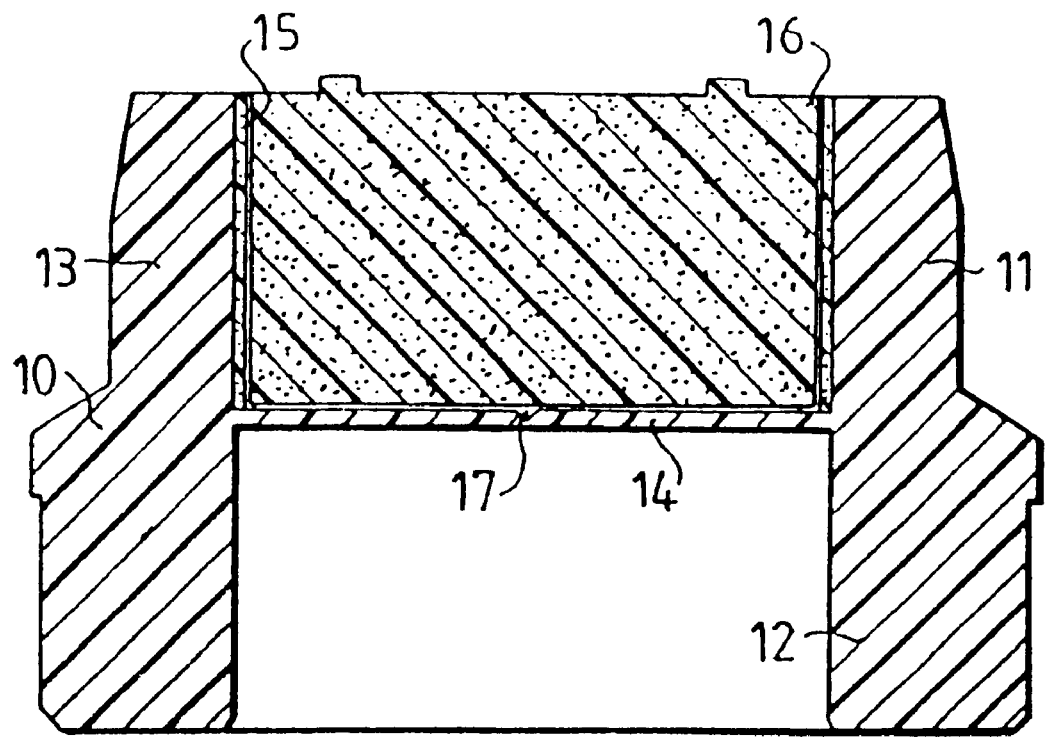

This application is related to U.S. Provisional Application Ser. No. 60/038,523, filed Feb. 26, 1997 and Swedish Patent Application No. 9700597-9, filed Feb. 20, 1997, the benefit of the dates of priority of which are claimed hereby under the provisions of Section 119(e) and 119, respectively. Moreover, the entire disclosures of these prior applications are incorporated by reference herein.

FIELD OF INVENTION

The invention relates to a process of preparing pharmaceutical closures for containers made of flexible polymeric materials which are suitable to be filled with parenterally administerable fluids prior to their sealing and sterilization. More particularly, closures are prepared which have an excellent resealing capacity after being penetrated by a piercing device for establishing fluid communication with the container, even after multiple entries into the container.

BACKGROUND OF THE INVENTION

The efforts of providing containers of polymeric materials for parenterally administerable products which are sterilizable after being finally filled and assembled, but also safe from migration of potentially hazardous agents and easy to recycle, have been previously disclosed in the International patent applications WO 95/08317, WO 97/37628 and WO 97/39952 which all are incorporated herein as references EP 0 097 054 (Hantakki Oy) discloses a flexible bag for medical fluids provided with an injection port which has a closure comprising a shielded resilient pierceable pad which reseals after penetration and which also may be protected from the stored fluids. This type of closure has the drawback in that it is quite complicated to assemble from different parts in the moment of sealing the ports and therefore is less suitable in an aseptic environment.

U.S. Pat. No. 4,303,067 (American Hospital Supply Corp.) describes an additive port for a medical bag through which medicals can be supplied by an injection device. The port has a puncturable, reasealable plug made of an elastomer. Nothing is disclosed about the resealing capacity or the sterilizability of the closure.

U.S. Pat. Nos. 4,975,308 and 5,247,015 describe molded stoppers for blood tubes made of a halobutyl rubber dispersed in a mixture of polyolefins and a thermoplastic elastomer. No disclosures are given herein about their resealing capacity after needle penetration or their capacity of being heat sterilized.

There are numerous other citations in the literature of closures for pharmaceutical containers of various types, both made of glass or of polymeric materials which are disclosed to be suitable to seal stored fluids for parenteral administration. Generally, it is a requirement from medical authorities that such closures must be capable of maintaining a barrier against the environment, both during sterilization by steam and during subsequent long term storage. It is also required that this type of closures shall be capable to reseal spontaneously and immediately after the withdrawal of a penetrating needle. They must also have a resealing capacity after multiple entries by penetrating needle, a cannula or a similar penetrating device suitable for collecting fluid from the container or for adding a component to be mixed with the contents of the container. An improper resealing of the closure after penetration potentially will waste the integrity of stored fluids by providing a channel for microbial growth into the container. It is also a requirement that the container must not leak when its closure is penetrated during fluid connection, for instance during infusion to a patient through a cannula. Furthermore, the closure must be compatible with stored fluids and no migration of potentially hazardous agents from any of its parts is allowed. The closure must also withstand conventional sterilization processes including autoclavation at 121° C. and sterilization by irradiation without losing any of its sealing capacity. It is also a requirement set by an increasing amount of medical authorities that each authorized container must be possible to recirculate and its therefore a demand that empty containers shall be possible to dispose without laborious disassembling and sorting of parts for individual recycling processes.

In the aforementioned International patent application WO 97/39952, ports for containers storing parenterally administerable fluids having closures generally fulfilling several of these requirements are disclosed which are designed to have all important parts correctly sterilized by pressurized steam in the autoclave. These closures typically comprise a frame or carrier part for a penetrable plug, wherein said carrier is adapted to seal an orifice by weak seal weldings or by being clamped in the orifice of the container. The penetrable plug of the closure is intended to be pierced by a device for establishing fluid communication with the container e.g. an injection syringe. As described in the previously mentioned Swedish patent application SE 9601540-9, such a closure can be produced in a two-color mold process wherein the generally sleeve formed carrier first is molded of thermoplastic material in a desired shape to sealingly fit with a container orifice, whereupon liquefied thermoplastic elastomer is injected into the sleeve to form the penetrable plug. These closures are highly advantageous over prior art sealing means by their simple production process and their comparatively simple assembly in a sealing position in a container orifice without extra time consuming steps, where their various parts must be assembled to form an adequate sealing device.

It is, however, a considerable technical problem to repeatedly manufacture this type of closures under conditions such that the elastomer plug obtains suitable characteristics of being resealable after multiple entries into the container by piercing devices, while it at also at the same time must form sealing adhesive bondings along the contact surface with the inner periphery of the carrier, so the two-part closure perfectly may seal against the environment. In particular, it has been connected with problems to find a reliable process which is reproducible in giving the penetrable plug specific resealing characteristics in a conventional two-part molding technique. This type of closure must also preferably be capable of forming a reliable seal with the container orifice, for example by forming weak seal weldings, as described in the above mentioned International patent application WO 95/08317.

DESCRIPTION OF INVENTION

It is an object of the present invention to provide a process for manufacturing pharmaceutical closures with a pierceable plug of an elastomeric material which safely reseals itself after being pierced with a syringe, a cannula or similar device capable of adding or withdrawing a fluid from a medical container.

It is also an object of the invention to provide a process which is highly reproducible in giving the pierceable plugs a resealing capacity after being pierced at least according to the DIN 58 363 part 15 standard.

It is a further object of invention to provide such a method of preparing pierceable plugs in a two-part injection molding technique to form adhesive bondings of an elastomer part and a carrier part in a highly reliable manner without employing any bonding agents and with low risk of contamination, while at the side time avoiding the formation of cavities between the two parts.

Another object of the present invention is the provision of pharmaceutical closures which consists of polyolefins to such an extent that both the closure and the polyolefinic container body can be recycled together without being disassembled and separately collected, while having a resealing capacity at least according to the DIN 58 363 part 15 standard.

A further object of the present invention is to provide pharmaceutical closures with the mentioned resealing capacity which are possible sterilize by high pressure steam (autoclavation) or by irradiation in a single process after being assembled with the container and maintain its integrity and other important characteristics, while being compatible with substantially all infusion fluids including lipophilic fluids like lipid emulsions without causing migration of potentially toxic agents.

A still further object of the present invention is to provide pharmaceutical closures of a two-part comprising a pierceable plug of an elastomer in a carrier part wherein said carrier part is provided with means for deleting cavities formed during the manufacturing process.

The present invention is directed to a method of preparing pharmaceutical closures of a two-part type comprising a generally sleeve-formed carrier made of a polyolefinic material coaxially enclosing a generally cylindrical elastomeric penetrable plug. The carrier part is separately formed in a molding process, whereupon heated elastomer is introduced into said carrier in an injection molding process with conventional injection molding tools, at a high pressure to form a penetrable plug. A characteristic feature of the method is that it allows for a relaxation period of the thermoplastic material in the injection molding tool to settle and develop its resealing characteristics. The relaxation is generated by letting the high pressure be lowered to a reduced overpressure level during a controlled relaxation period and by subsequently gradually reducing the overpressure to an atmospheric pressure over a prolonged cooling period. Another feature of the method is to, before the elastomer is introduced cooling the carrier from its high forming temperature to a temperature well above room temperature but not exceeding about 60° C.

By such a method suitable adhesive bondings are provided in the contact surface between the carrier and the elastomer plug while the elastomer material is allowed to relax in a controlled manner. The relaxation period and subsequent cooling and settling period leads to a relaxation on a molecular level which surprisingly enhances the recovery characteristics of the elastomer material, so it obtains an excellent rescaling capacity.

The elastomer is heated to fluidity, or to reasonable flow characteristics, which typically means to a temperature exceeding 180° C., dependent on the selected thermoplastic elastomer. By the specific features of the carrier part, more closely described below, air will be spontaneously evacuated from its inside when the heated elastomer is injected under high pressure which obstructs the formation of air cavities or bubbles in the elastomer and in the region between the elastomer and the carrier.

After the high pressure introduction in the carrier, the pressure is released to a lower level of overpressure and during this relaxation period more heated elastomer can be reintroduced into the carrier to compensate for any shrinking effect, when the elastomer is cooled. Preferably, to obtain the suitable resealing characteristics with said method, the relationship between the magnitude of the reduced over pressure and high pressure is about between 1:2 and 1:5, a preferred relationship is about 1:3.

The initial high pressure level in the injection molding is preferably at least about 20 bar, but not exceeding about 50 bar. The reduced overpressure exerted during the relaxation period is preferably not more than about 17 bar.

Preferably the high pressure step and the subsequent relaxation step has about the same duration. The high pressure step, has a preferred duration of about 3 to 5 seconds, and most preferably about 4 seconds, while the controlled relaxation period has a duration of more than one second, but does preferably not exceed five seconds, most preferably it has duration of about 3 three seconds. The subsequent cooling period preferably is preferably is longer than the sum of the high pressure step and the controlled relaxation step. Preferably the cooling step is about 10 to about 20 seconds.

The method according to the present invention can be performed by conventional injection molding equipment. The person skilled in this field of technology will have no difficulties in finding suitable equipment to mold the carrier part in a desired shape and to transfer it in the protected environment of a two-part molding station and fill it with an injected heated, flowing elastomer under high pressure.

The carrier is preferable essentially consisting of medical grade polyolefins which may be compounded with a fraction of thermoplastic elastomer and shall generally be capable of scaling the container orifice, for example by forming weak seal weldings with a compatible material of the container orifice. Preferably, the polyolefin is polypropylene or polyethylene based which means that it essentially consists of polypropylene or polyethylene, optionally with a fraction copolymerized ethylene or propylene. Various medical grades of pure polypropylene or polyethylene are also conceivable materials The elastomer material for production of the resealable plug preferably comprises a polyolefin compatible with the carrier and a thermoplastic elastomer. Suitable commercially available materials are Dynaflex® from GLS Corp., containing polypropylene and SEBS (styrene-ethylene-butadiene-styrene), Santoprene® containing polypropylene and EPDM-rubber, Evoprene® from Evode, Cflex and Craiwton®, as well as and various materials containing polyisobutylene (PIB).

The inventive method will specifically be useful for preparing pharmaceutical closures with a penetrable plug made of elastomer which has a resealing capacity which fulfills at least the requirements of standard norm DIN 58 363 Part 15 that it should be reasealable after a penetration with a 0.6 mm needle without any escape of fluid.

DETAILED DESCRIPTION OF DRAWING

FIG. 1 shows a schematic side-view of a pharmaceutical closure according to the present invention.

Referring to FIG. 1 a carrier, frame-like construction 10 is molded in a conventional equipment from polypropylene granules of a medical grade. The carrier is generally is sleeve-formed and has an upper generally cylindrical part 11 designated to face the environment in its sealing position and lower generally cylindrical part 12 designated to front the stored fluids of a container. The upper part is provided with a frame 13 to be filled with an elastomer to form the penetrable plug. The lower part may be provided with means for facilitating the sealing connection with an orifice of the container (not shown), such as corresponding, flanges or protrusions fitting with the container. A thin partition membrane 14 of the carrier seals off the elastomer plug from the stored liquid to prevent from potential extraction or migration of compounds from the elastomer materials to the stored fluids. The carrier can be provided with a means for evacuation of any undesired cavities of air generated during the molding of the elastomer. This means preferably comprise a narrow annular channel 15, 16 extended axially along the inner periphery its upper part 11, as schematically is shown in FIG. 1. The channel serves as a means of transporting air cavities or bubbles to the atmosphere. Such air cavities may appear during the injection of the liquefied elastomer into the carrier. For this reason, the channel is connected to at least one shallow groove 17 which is radially extended in the upper surface of the partition 14. This arrangement will lead to that air in the form of voids or bubbles will be directed out of the elastomer mold by means of the grooves in communication with the channels. The dimensions of the channels and grooves generally are small and typically substantially less than a 1 mm, preferably less than 0.5 mm and they are incorporated in the carrier part during its manufacture by molding by adding an appropriate design to the forming steel. Such forming measures are well known to the skilled person and will not be discussed here in more detail.

In the manufacturing process, the carriers are transferred from its production site to a position for two-part injection molding with elastomer during a short limited time (less than 10 seconds) in controlled atmosphere to protect them from contamination. During the transfer, the carrier is cooled from its molding temperature of about 250° C. to a temperature of about 80° C. During the injection molding, a high pressure of about 20–50 bar is exerted and liquefied Dynaflex® (thermoplastic elastomer containing polypropylene and SEBS) heated to about 200 to 220° C. is injected an filled in the frame 13 of the carrier, having a temperature of about 60° C. in order to form suitable adhesive bondings. The pressure is then released to a lower level of overpressure, not higher than about 17 bars for about 3 seconds for a relaxation period, before the pressure is gradually released to the level of the ambient atmosphere during about 20 seconds in a cooling period. The carrier preferably is filled to about 95% with elastomer from the beginning in the high pressure period to compensate for the shrinking of the material and can optionally be refilled with elastomer in a controlled manner during the relaxation period. The closures are then released from the injection molding equipment and may be collected and transferred for use with selected containers in a filling and sealing arrangement. According to the embodiment where the carrier comprises the channel for directing air away from the elastomer mold, it is preferred that the main cavity of carrier part is first filled with elastomer, whereupon the channel is filled in a final stage.

The two-part closures made with this process have an excellent resealing capacity even after being penetrated several times by sharp objects, like needles and cannulas for introduction or removal of fluid to or from containers where they are sealingly fitted. As evident from the following example the resealing capacity exceeds the requirements set on the standard norm DIN 58 363 part 15 for infusion containers and accessories.

It should be understood that it is possible for the skilled person to depart from the mentioned, specific shape of the closures and specified material as well as the process parameters used in this example and still arrive within the process and articles, as claimed in the appended claims.

EXAMPLE

Pharmaceutical closures prepared as described above are inserted to sealing in a corresponding mouth piece of flexible bag type container filled with a nominal volume of an aqueous parenteral solution. The sealed container is sterilized by means of conventional autoclavation and cooled, whereupon the surface assigned for injection of the closure is penetrated with a cannula of 0.8 mm diameter. After removal of the cannula the injection point is subjected to an internal pressure of 20 kPa for 10 seconds in order to determine the leak resistance at the injection point. No leak is detected. These measures are repeated two consecutive times for the same closure without any leaks.

In order to determine the spike retention in a closure according to the present invention, a spike conventional in infusion sets is inserted through its injection point to establish fluid connection with a container sealed with sad closure. The inserted spike was then subjected to a downwards force of 10 N for 5 hours. The spike remained immobilized in the closure and no leakage of solution was detected.

In a second test set up to determine the spike retention under pressure in a closure according to the present invention, a spike conventional in infusion sets is inserted through its injection point to establish fluid connection with a container sealed with said closure. The flexible container was then subjected to an internal pressure of about 20 kPa for 15 seconds. No leakage of solution was detected.

What is claimed is:

1. A pharmaceutical closure comprising a carrier and a penetrable plug, both comprising a recyclable polyolefinic material;
   said carrier coaxially enclosing said penetrable plug comprising further an elastomer component; and
   wherein said carrier comprises a narrow annular channel extending axially along the inner periphery of its upper part.

2. A pharmaceutical closure comprising a carrier and a penetrable plug, both comprising a recyclable polyolefinic material;
   said carrier coaxially enclosing said penetrable plug comprising further an elastomer component;
   said closure having a resilient capacity which when punctured with a 0.6 mm cannula, does not allow air to escape through said puncture when tested with an internal overpressure of 15 kPa for 15 seconds; and
   wherein said carrier comprises a narrow annular channel extending axially along the inner periphery of its upper part.

3. A pharmaceutical closure according to claim 2 wherein the recyclable polyolefinic material is a recyclable ethylene or propylene (co)polymer.

4. A pharmaceutical closure according to claim 2 wherein the recyclable polyolefinic material is a recyclable polypropylene or polyethylene.

5. A closure according to claim 2 characterized in that the carrier has a partition protecting the plug from fluid contact during storage.

6. A closure according to claim 2 characterized in that the carrier is provided with means to remove air from bubbles or cavities generated during the injection molding of the elastomer.

7. A closure according to claim 6 characterized in that said means comprises a shallow groove in the upper face of the partition of the carrier.

* * * * *